US008970783B2

(12) United States Patent
Kachi (10) Patent No.: US 8,970,783 B2
(45) Date of Patent: Mar. 3, 2015

(54) IMAGE PROCESSING APPARATUS AND CONTROL METHOD THEREFOR

(71) Applicant: Canon Kabushiki Kaisha, Tokyo (JP)

(72) Inventor: Yasushi Kachi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 13/849,063

(22) Filed: Mar. 22, 2013

(65) Prior Publication Data

US 2013/0258163 A1  Oct. 3, 2013

(30) Foreign Application Priority Data

Mar. 30, 2012  (JP) ................................. 2012-079529

(51) Int. Cl.
| | |
|---|---|
| *H04N 7/00* | (2011.01) |
| *H04N 5/228* | (2006.01) |
| *H04N 9/083* | (2006.01) |
| *H04N 3/14* | (2006.01) |
| *H04N 5/335* | (2011.01) |
| *H04N 9/04* | (2006.01) |
| *H04J 3/02* | (2006.01) |
| *H04N 5/369* | (2011.01) |

(52) U.S. Cl.
CPC .............. *H04N 5/369* (2013.01); *H04N 9/045* (2013.01)
USPC ......... 348/477; 348/222.1; 348/272; 370/537

(58) Field of Classification Search
None
See application file for complete search history.

(56) References Cited

U.S. PATENT DOCUMENTS

| | | | | |
|---|---|---|---|---|
| 8,422,547 B2* | 4/2013 | Yamashita | .................... | 375/240 |
| 8,698,885 B2* | 4/2014 | DiCarlo et al. | ................. | 348/71 |
| 8,755,410 B2* | 6/2014 | Todo et al. | ..................... | 370/493 |
| 8,854,540 B2* | 10/2014 | Yamashita | ..................... | 348/441 |
| 2002/0159645 A1* | 10/2002 | Kobayashi et al. | ........... | 382/243 |
| 2005/0281296 A1* | 12/2005 | Yamashita | ..................... | 370/537 |
| 2006/0114991 A1* | 6/2006 | Kim et al. | ................. | 375/240.03 |
| 2006/0210254 A1* | 9/2006 | Yamashita et al. | ............. | 386/117 |
| 2009/0073320 A1* | 3/2009 | Todo et al. | ..................... | 348/705 |
| 2010/0020233 A1* | 1/2010 | Ueno et al. | ..................... | 348/452 |
| 2010/0149412 A1* | 6/2010 | Yamashita | ..................... | 348/443 |
| 2011/0149110 A1* | 6/2011 | Sugiyama | .................. | 348/223.1 |
| 2011/0170003 A1* | 7/2011 | Todo et al. | ..................... | 348/484 |
| 2011/0205247 A1* | 8/2011 | Yamashita | ..................... | 345/660 |
| 2012/0008044 A1* | 1/2012 | Nagata et al. | ..................... | 348/478 |
| 2012/0206582 A1* | 8/2012 | DiCarlo et al. | .................. | 348/71 |
| 2013/0038749 A1* | 2/2013 | Hatakeyama et al. | ..... | 348/222.1 |
| 2013/0071045 A1* | 3/2013 | Hayashi | ........................ | 382/299 |
| 2013/0107941 A1* | 5/2013 | Kazui et al. | ............... | 375/240.03 |
| 2013/0129238 A1* | 5/2013 | Sasai et al. | ..................... | 382/233 |
| 2013/0258147 A1* | 10/2013 | Kachi | ............................ | 348/280 |
| 2013/0265383 A1* | 10/2013 | Yamashita | ................. | 348/14.08 |

FOREIGN PATENT DOCUMENTS

JP  2002-199414 A  7/2002

* cited by examiner

*Primary Examiner* — Michael Osinski
(74) *Attorney, Agent, or Firm* — Cowan, Liebowitz & Latman, P.C.

(57) ABSTRACT

An image processing apparatus obtains information of an effective pixel of an image pickup element and information of a pixel on the periphery thereof, sets a position where image data of the peripheral pixel is multiplexed in accordance with a transmission method, generates a data stream by multiplexing image data of the effective pixel and the image data of the peripheral pixel in accordance with the set multiplexing position and the transmission method, and multiplexes information on the set multiplexing position and information on the peripheral pixel area to the data stream.

14 Claims, 13 Drawing Sheets

| R | Gr | R | Gr | R | Gr | R | Gr |
|---|----|---|----|---|----|---|----|
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |

RED

| | | | | | | |
|---|---|---|---|---|---|---|
| 1 | R | R | R | R | ... | R | R |
| 2 | R | R | R | R | ... | R | R |
| 3 | R | R | R | R | ... | R | R |
| 4 | R | R | R | R | ... | R | R |
| | ⋮ | ⋮ | ⋮ | ⋮ | | ⋮ | ⋮ |
| 1079 | R | R | R | R | ... | R | R |
| 1080 | R | R | R | R | ... | R | R |

FIG. 5B

GREEN (Gr)

| | | | | | | |
|---|---|---|---|---|---|---|
| 1 | Gr | Gr | Gr | Gr | ... | Gr | Gr |
| 2 | Gr | Gr | Gr | Gr | ... | Gr | Gr |
| 3 | Gr | Gr | Gr | Gr | ... | Gr | Gr |
| 4 | Gr | Gr | Gr | Gr | ... | Gr | Gr |
| | ⋮ | ⋮ | ⋮ | ⋮ | | ⋮ | ⋮ |
| 1079 | Gr | Gr | Gr | Gr | ... | Gr | Gr |
| 1080 | Gr | Gr | Gr | Gr | ... | Gr | Gr |

FIG. 5C

GREEN (Gb)

|  | | | | | | |
|---|---|---|---|---|---|---|
| 1 | Gb | Gb | Gb | Gb | ⋯ | Gb | Gb |
| 2 | Gb | Gb | Gb | Gb | ⋯ | Gb | Gb |
| 3 | Gb | Gb | Gb | Gb | ⋯ | Gb | Gb |
| 4 | Gb | Gb | Gb | Gb | ⋯ | Gb | Gb |
|   | ⋮ | ⋮ | ⋮ | ⋮ |   | ⋮ | ⋮ |
| 1079 | Gb | Gb | Gb | Gb | ⋯ | Gb | Gb |
| 1080 | Gb | Gb | Gb | Gb | ⋯ | Gb | Gb |

FIG. 5D

BLUE

|  | | | | | | |
|---|---|---|---|---|---|---|
| 1 | B | B | B | B | ⋯ | B | B |
| 2 | B | B | B | B | ⋯ | B | B |
| 3 | B | B | B | B | ⋯ | B | B |
| 4 | B | B | B | B | ⋯ | B | B |
|   | ⋮ | ⋮ | ⋮ | ⋮ |   | ⋮ | ⋮ |
| 1079 | B | B | B | B | ⋯ | B | B |
| 1080 | B | B | B | B | ⋯ | B | B |

FIG. 6

| POSITION OF PERIPHERAL PIXEL | POSITION IN TRANSMISSION FRAME | | POSITION IN TRANSMISSION DATA | | | |
|---|---|---|---|---|---|---|
| | START COORDINATE (UPPER LEFT-HAND) | END COORDINATE (LOWER RIGHT-HAND) | TRANSMISSION START LINE NUMBER | NUMBER OF LINES | TRANSMISSION START SAMPLE NUMBER | NUMBER OF SAMPLES |
| UPPER | (8,0) | (4103,7) | 38 | 4 | 0 | 2048 |
| LOWER | (8,2168) | (4103,2175) | 33 | 4 | 0 | 2048 |
| L1 | (0,0) | (7,7) | 38 | 4 | 2192 | 4 |
| L2 | (0,8) | (7,2167) | 42 | 1080 | 2192 | 4 |
| L3 | (0,2168) | (7,2175) | 33 | 4 | 2192 | 4 |
| R1 | (4104,0) | (4111,7) | 38 | 4 | 2186 | 4 |
| R2 | (4104,8) | (4111,2167) | 42 | 1080 | 2186 | 4 |
| R3 | (4104,2168) | (4111,2175) | 38 | 4 | 2186 | 4 |

FIG. 8

| 3G-SDI SIGNAL | | MULTIPLEXING ORDER OF IMAGE DATA |
|---|---|---|
| LINK A | DATA STREAM 1 | Gb1,Gb2,Gb3,···,Gb2047,Gb2048 |
| | DATA STREAM 2 | B1,R1,B3,R3,···,B2045,R2045,B2047,R2047 |
| LINK B | DATA STREAM 1 | Gr1,Gr2,Gr3,···,Gr2047,Gr2048 |
| | DATA STREAM 2 | B2,R2,B4,R4,···,B2046,R2046,B2048,R2048 |

FIG. 11 ously known. The image pickup
IMAGE PROCESSING APPARATUS AND CONTROL METHOD THEREFOR

BACKGROUND OF THE INVENTION

1. Field of the Invention

The present invention relates to an image processing apparatus, and particularly, to image data processing that generates transmission data of image data.

2. Description of the Related Art

In the related art, an image pickup apparatus using an image pickup element having a pixel array with a color filter of the Bayer structure is generally known. The image pickup element receives image light via the color filter from an object by a photoelectric conversion element configuring a pixel and outputs an image signal correspondingly to the intensity of the image light. A processing unit at a back-end performs predetermined processing with respect to the image signal to display an image on a viewfinder or an external display apparatus. In general, R, G, and B pixels, which can output R, G, and B signals, respectively, are disposed in the image pickup element in a predetermined pattern.

Further, an apparatus is also discussed, which converts moving image data obtain d by the image pickup element of the Bayer structure into a luminance signal and a color difference signal and transmits the signals according to the HD-SDI standard (SMPTE 274M) discussed in Society of Motion Picture and Television Engineers (SMPTE) (see, for example, Japanese Patent Application Laid-Open No. 2002-199414).

In Japanese Patent Application Laid-Open No. 2002-199414, the moving image data is converted into luminance and color difference data to be transmitted, and as a result, the moving image data of the Bayer structure could not be transmitted. Further, in the case where the moving image data of the Bayer structure is transmitted according to the standard such as the HD-SDI, a receiving side performs processing of appropriately converting signals of RGB into data of luminance and a color difference. In this case, in order to normally perform conversion processing, data (peripheral pixel data) of pixels outside an effective pixel area of a pixel array is required.

SUMMARY OF THE INVENTION

The present invention is contrived to solve the problems. In particular, an aspect of the present invention is to generate transmission data to appropriately transmit information of a pixel required to process moving image data at the time of transmitting the moving image data output from the image pickup element of the Bayer structure.

According to an embodiment of the present invention, an image processing apparatus includes: an obtaining unit obtaining moving image data output from an image pickup element having a predetermined pixel array; a generation unit generating a data stream including image data of an effective area, in accordance with a transmission method of transmitting the image data of the effective area of the moving image data; and a transmission unit transmitting the data stream generated by the generation unit, the generation unit generating the data stream by multiplexing image data of an area on the periphery of the effective area and positional information on a position where the image data of the peripheral area is multiplexed, onto the image data of the effective area.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Exemplary embodiments of the present invention will now be described in detail in accordance with the accompanying drawings.

First Embodiment

Figure 1:
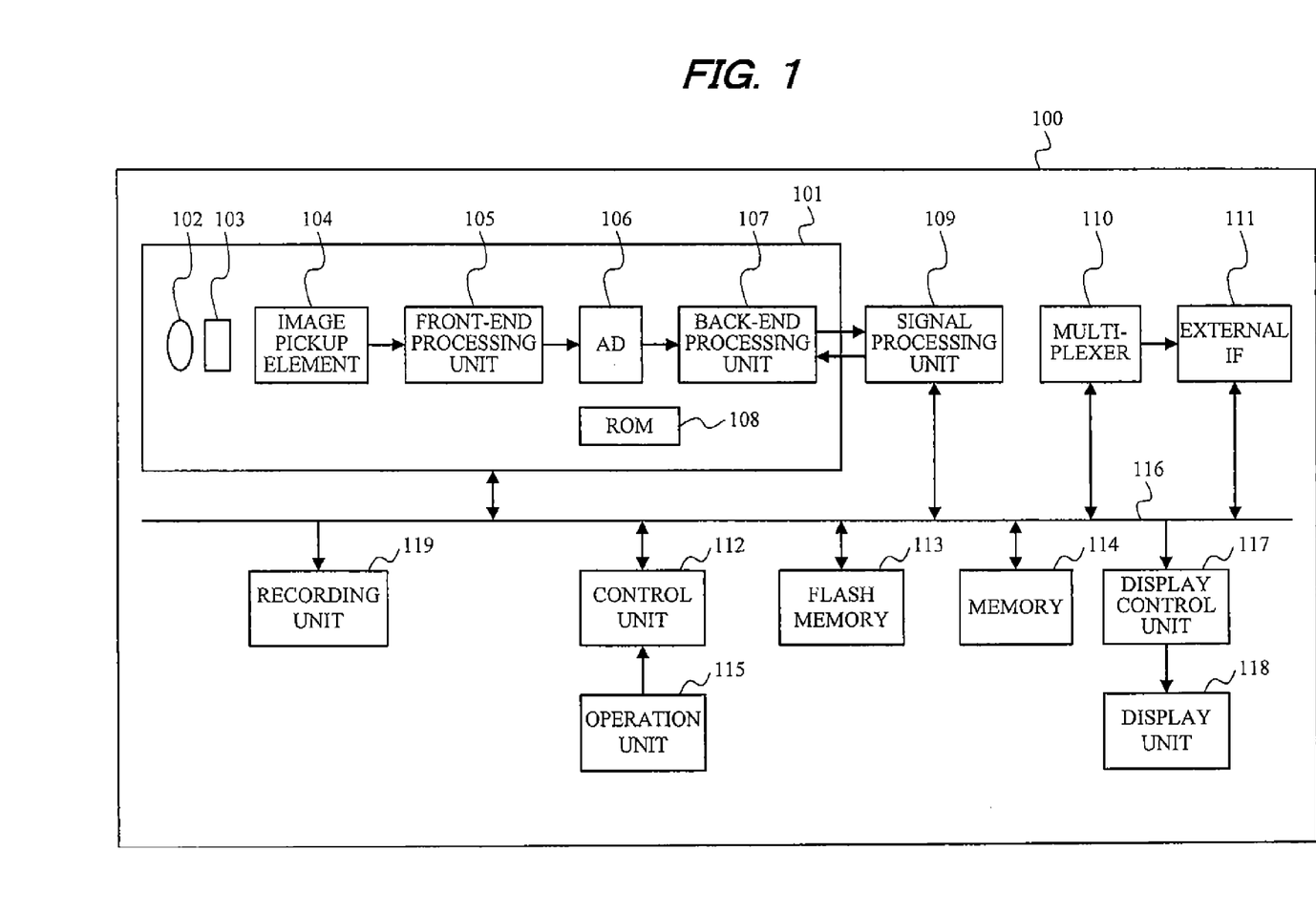
FIG. 1 is a diagram illustrating a block configuration of an image pickup apparatus according to an embodiment of the present invention.

FIG. 1 is a block diagram illustrating a configuration example of an image pickup apparatus according to the embodiment. The image pickup apparatus of the present embodiment is configured to multiplex a pixel on the periphery of an effective area (hereinafter, referred to as a peripheral pixel), and combine and transmit information to specify a position of the pixel in a frame and multiplexing position of a signal, at the time of transmitting the moving image data of the Bayer structure according to an SDI standard. Therefore, the apparatus may be a transmission apparatus of image data as well as the image pickup apparatus.

In FIG. 1, an image pickup unit 101 includes an image pickup lens 102, a shutter 103, an image pickup element 104, a front-end processing unit 105, an A/D converter 106, a back-end processing unit 107, and a ROM 108. The image pickup lens 102 includes a zoom lens and a focus lens. The shutter 103 also serves as an iris function.

Figure 2:
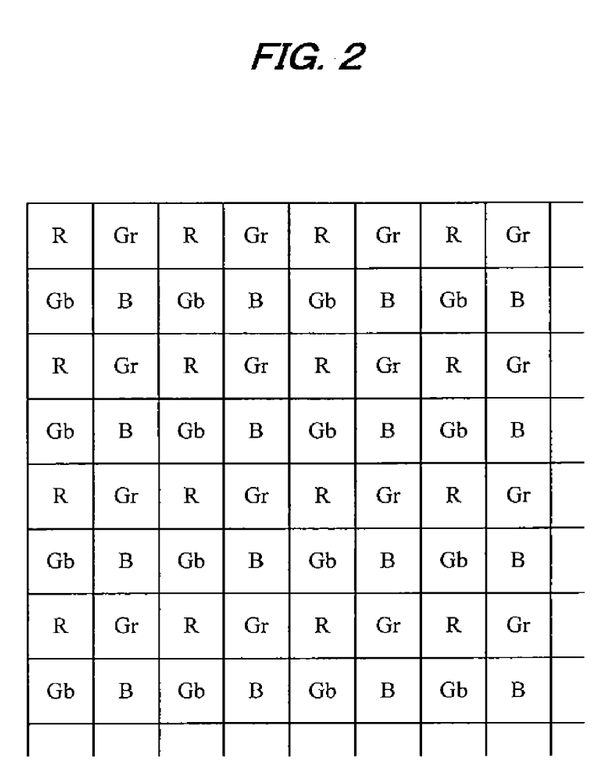
FIG. 2 is a diagram schematically illustrating a pixel array of an image pickup element of the Bayer structure.

The image pickup element 104 has a pixel array by a CCD sensor or a CMOS sensor with a color filter of a Bayer structure illustrated in FIG. 2 and converts an optical image into an electric signal. The image pickup element 104 supplies the electric signal indicating an amount of charge accumulated in the pixel to the front-end processing unit 105 in a progressive manner, at a timing (1/30 seconds in the embodiment) of a clock supplied from a control unit 112 to be described below. The front-end processing unit 105 includes a correlated double sampling (CDS) unit or an automatic gain control (AGC) unit for removing output noise of the image pickup element 104. The front-end processing unit 105 receives the electric signal from the image pickup element and the A/D converter 106 converts an analog signal output from the front-end processing unit 105 into a digital signal.

The back-end processing unit 107 separates image data supplied from the A/D converter 106 into four pixel planes of R, Gr, Gb, and B (red, green, green, and blue). After linear matrix processing of color reproduction is applied to respective components, pixel data of 10 bits of each color is supplied to a signal processing unit 109.

As information on the image pickup element 104, a total number of pixels, horizontal and vertical sizes, the positions of an effective pixel, and the like are recorded in the ROM 108.

The signal processing unit 109 performs processing to be described below with respect to the supplied pixel data of R, Gr, Gb, and B, and generates data of a format suitable for transmission and stores the generated data in a memory 114. A multiplexer 110 reads out the data to be transmitted, from the memory 114 and multiplexes the read-out data, and sends the corresponding data to an external interface 111. The external IF 111 transmits moving image data to the outside according to a Serial Digital Interface (SDI) standard.

The control unit 112 includes a CPU and controls each unit of the image pickup apparatus 100 according to controlling software stored in a flash memory 113. The control unit 112 detects an input from an operation unit 115 and controls the image pickup unit 101, the signal processing unit 109, and the multiplexer 110 while synchronizing with timings. The control unit 112 temporarily records data generated by various processings, in the memory 114, and reads out the data as necessary. A program which is electrically erasable and recordable, and is required to operate the control unit 112 or unique adjustment data of the image pickup apparatus 100 is, in advance, written in the flash memory 113. A display control unit 117 generates moving image data for display, by performing predetermined processing such as deBayer processing with respect to the moving image data of the Bayer structure obtain d from the image pickup unit 101, and sends the generated moving image data to a display unit 118. The display unit 118 displays the picked-up moving image data. For example, the deBayer processing includes interpolation processing for RAW data. A recording unit 119 encodes the moving image data output from the image pickup unit 101 by a known encoding method such as H.264, and the like to compress an information amount, and records the compressed data in a recording medium (not illustrated). Each component described above is connected with an internal bus 116 which is a transmission path for a control signal or a data signal between the respective components.

In the image pickup apparatus 100, when power is input from the operation unit 115, the control unit 112 controls each unit, and displays the image data, which is picked up by the image pickup unit 101, on the display unit 118 to go into an image pickup standby state. In the image pickup standby state, when an instruction of an image pickup start is received from the operation unit 115, the control unit 112 controls each unit as described below and outputs the picked-up image data from the external IF 111. When an instruction of an image pickup stop is received, the control unit 112 stops outputting the image data from the external IF 111. Further, the control unit 112 records the picked-up moving image data by controlling the recording unit 119 in accordance with the instruction of the image pickup start and stops recording the moving image data in accordance with the instruction of the image pickup stop.

Figure 3:
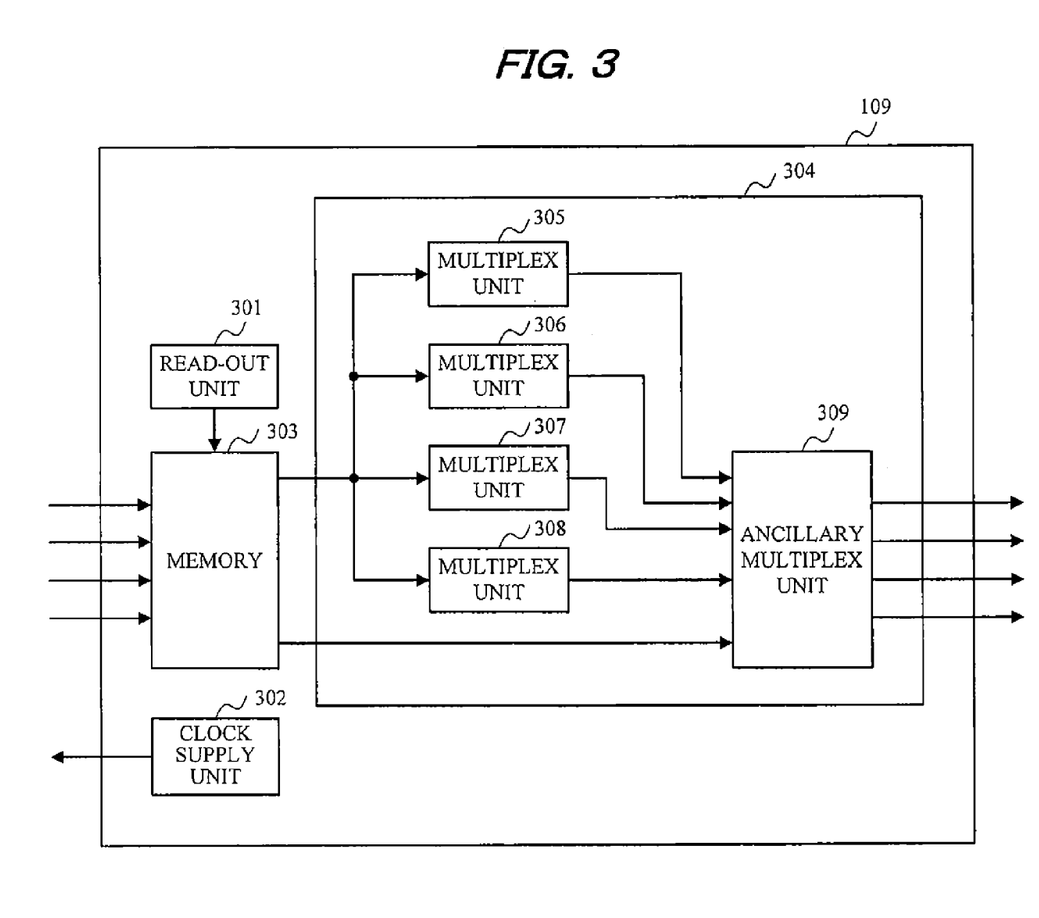
FIG. 3 is a block diagram illustrating a configuration of a signal processing unit of the image pickup apparatus of FIG. 1.

FIG. 3 illustrates a configuration of the signal processing unit 109. A memory 303 temporarily stores the data of the pixel of each color received from the back-end processing unit 107 of the image pickup unit 101. A clock supply unit 302 supplies a read-out clock of the data of the pixel to the back-end processing unit 107. The pixel data supplied to the memory 303 from the back-end processing unit 107 is stored in the memory 303 by dividing the pixel data into data of an effective pixel and data of a peripheral pixel, by the control unit 112. A read-out unit 301 reads out the data of the pixel from the memory 303 and supplies the read-out data to a signal multiplexing unit 304. Further, as the memory 303, a part of a storage area of the memory 114 may also be used.

The signal multiplexing unit 304 rearranges the supplied pixel data in an order suitable for transmission, multiplexes a timing reference signal start of active video (SAV)/end of active video (EAV), and generates a data stream obtained by further multiplexing various ancillary data.

Subsequently, an operation when the control unit 112 records the pixel data supplied from the back-end processing unit 107 in the memory 303 will be described.

Figure 4:
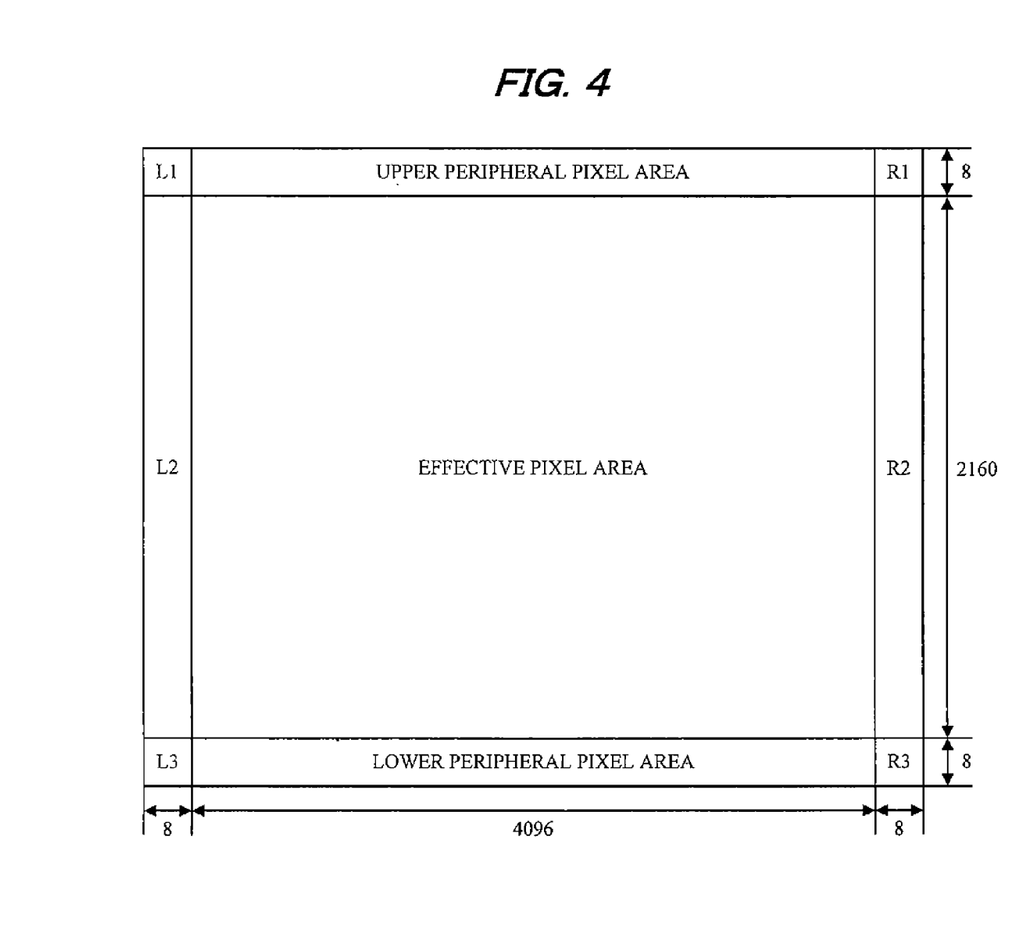
FIG. 4 is a diagram schematically illustrating a configuration of a pixel layout in a pixel area of the image pickup element.
Figure 5A:
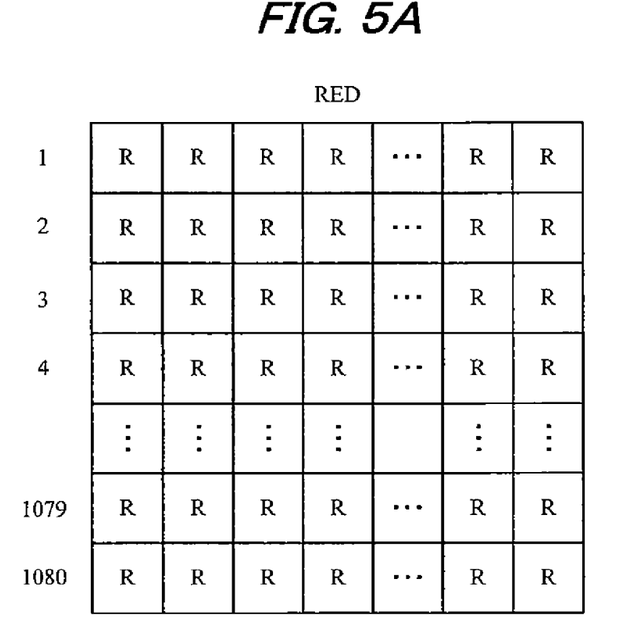
FIGS. 5A, 5B, 5C and 5D are diagrams conceptually illustrating a data array configuration when an image signal output from an effective pixel area of the image pickup element of the Bayer structure is stored in a RAM.
Figure 5B:
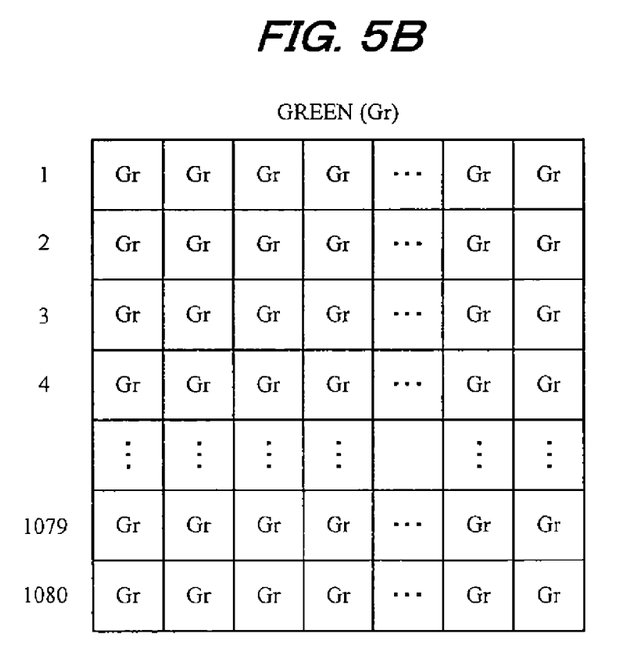
Figure 5C:
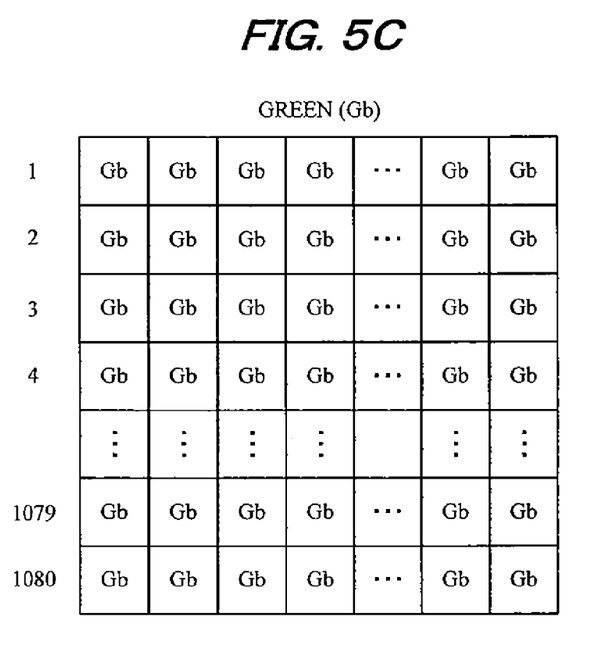
Figure 5D:
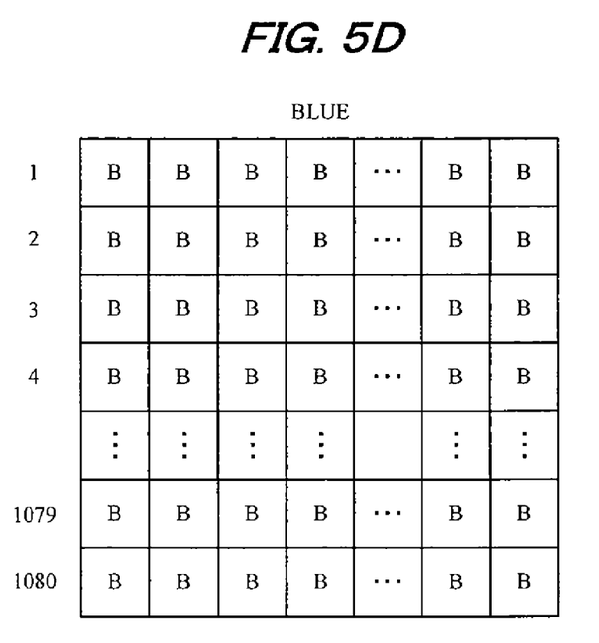

For example, a case in which the pixel area on the image pickup element 104 is configured in a pixel layout of FIG. 4 will be described. As illustrated in FIG. 4, the image pickup element 104 is constituted by an effective pixel area and a peripheral pixel area. A pixel data group, which is obtainable at one time from an entire area of the pixel array, is defined as a RAW frame. The number of pixels of the RAW frame is 4112 (4096+8+8) in horizontal (lateral in the figure) and the number of pixels is 2176 (2160+8+8) in vertical (longitudinal in the figure), and the pixels are arranged in the Bayer structure.

The control unit 112 reads out information on vertical and horizontal widths of the aforementioned pixel array and the position of each area and information on an arrangement method of each pixel of the Bayer structure from the ROM 108. The control unit 112 controls a recording timing based on information on the image pickup element 104, and divides the signal supplied from the back-end processing unit 107 into the effective pixel data and the peripheral pixel data and records the divided data in different areas of the memory 303 respectively. The peripheral pixel data is used in the interpolation processing, and the like in the deBayer processing of the effective pixel data.

FIGS. 5A to 5D illustrate pixel data of respective colors R, Gr, Gb, and B of the effective pixel areas constituting the RAW frame, which the control unit 112 records in the memory 303. In the case of a pixel group of each color, the number of pixels is 2048 in horizontal and the number of pixels is 1080 in vertical. Further, the control unit 112 stores the data of the peripheral pixels positioned in eight areas (an upper side portion, a lower side portion, left side portions L1, L2, and L3, and right side portions R1, R2, and R3) illustrated in FIG. 4 in the memory 303, distinguishable from the pixel data of the effective pixel area.

Figure 6:
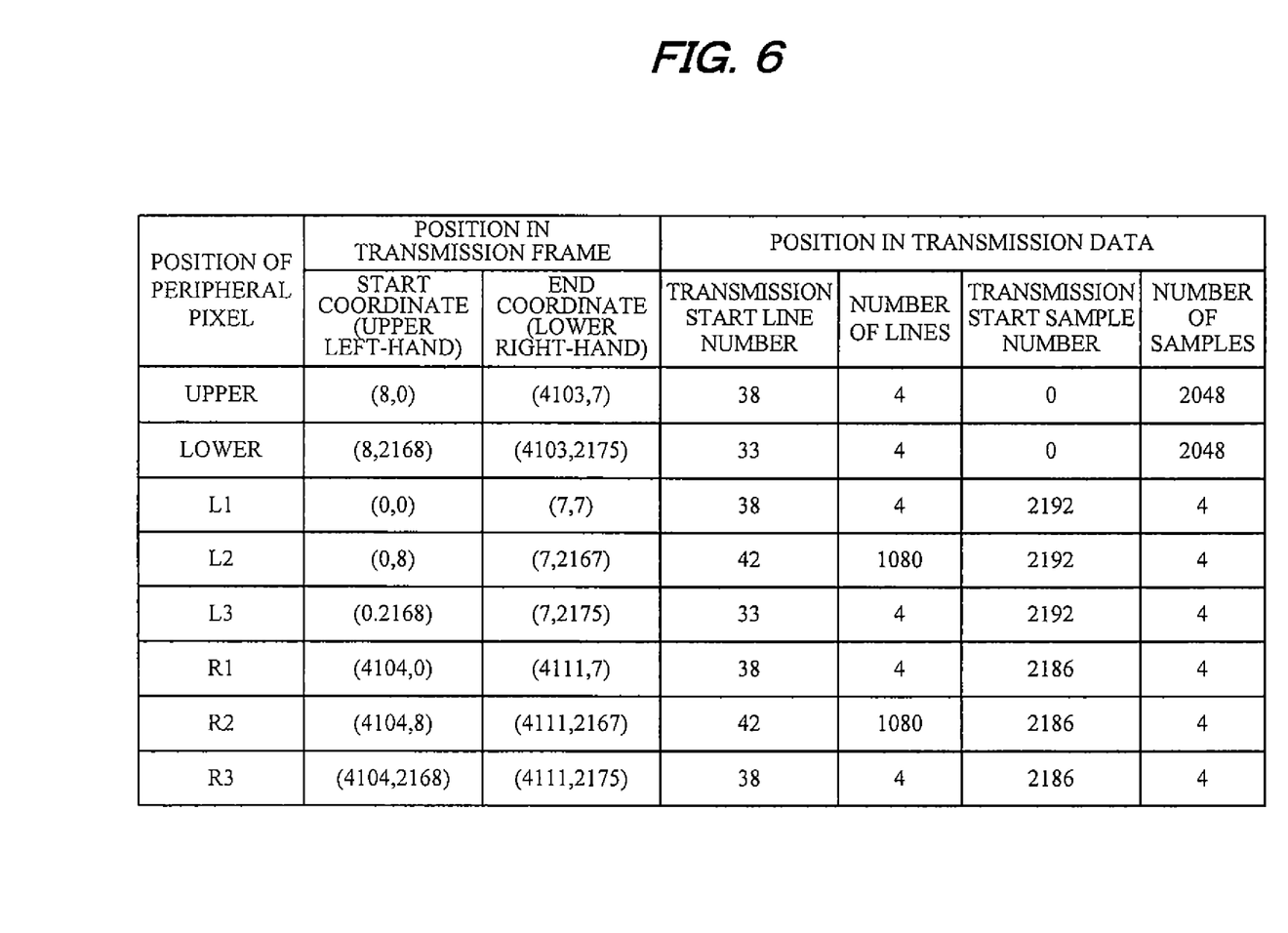
FIG. 6 is a diagram illustrating a configuration of a data table indicating information of peripheral pixel data according to an embodiment of the present invention.

In this case, the control unit 112 prepares a data table illustrated in FIG. 6 and stores the prepared data table in the memory 114 in association with the data of the peripheral pixel. The data table indicates set values of the position of the data of each peripheral pixel in the RAW frame and multiplexing position in a transmission signal at the time of transmitting the data of the peripheral pixel. The control unit 112 calculates the position and range of each peripheral pixel data from the information on the configuration of the RAW frame. Further, the control unit 112 selects the multiplexing position, which is set in advance with respect to the transmission signal, in accordance with a combination of the information of the RAW frame and a transmission method.

The set value of the multiplexing position in the signal illustrated in FIG. 6 is shown as one example. Since the numbers of lines and samples of a digital active line and a blanking area differ according to the transmission method, the multiplexing position of the peripheral pixel data is set according to a format of the RAW frame. The peripheral pixel data may be multiplexed with respect to a position in the blanking area, where the other signals are not multiplexed.

The above-described operation when the control unit 112 records the pixel data supplied from the back-end processing unit 107 in the memory 303.

Figure 7:
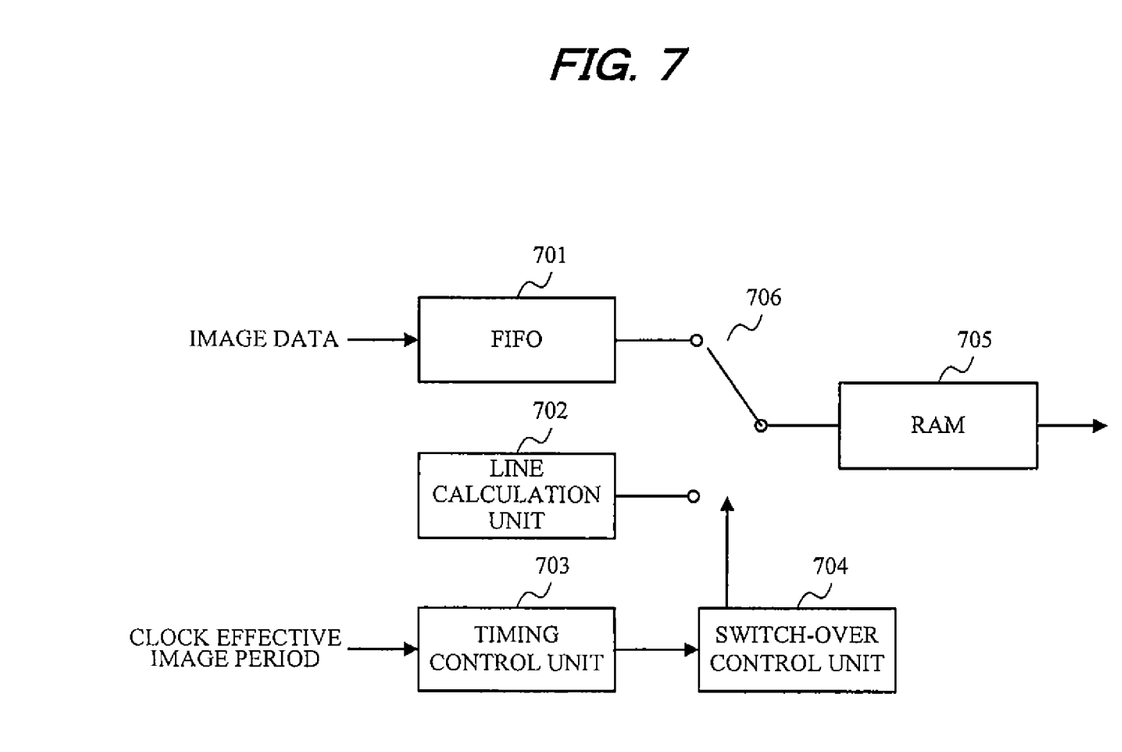
FIG. 7 is a block diagram illustrating a configuration of a multiplexing unit included in the signal processing unit of FIG. 3.

Subsequently, operations of multiplexing units 305 to 308 will be described. FIG. 7 illustrates a configuration example which is common to the multiplexing units 305 to 308.

A FIFO 701 stores input pixel data in synchronization with a writing clock supplied from the control unit 112. In this case, the control unit 112 distributes the pixel data of each color to the multiplexing units 305 to 308 according to a multiplexing structure of the transmitted pixel data, respectively.

In the present embodiment, the moving image data is transmitted according to the SDI standard. In detail, transmitting the moving image data conforms with level B of SMPTE ST 425 (3G-SDI) and a multiplexing structure of 10 bits of R'G'B'+A of SMPTE ST 372 (dual link) is applied to distribute each pixel data. Further, a sample format of a pixel conforms with 2048×1080/30P defined as SMPTE ST 2048-2.

Figure 8:
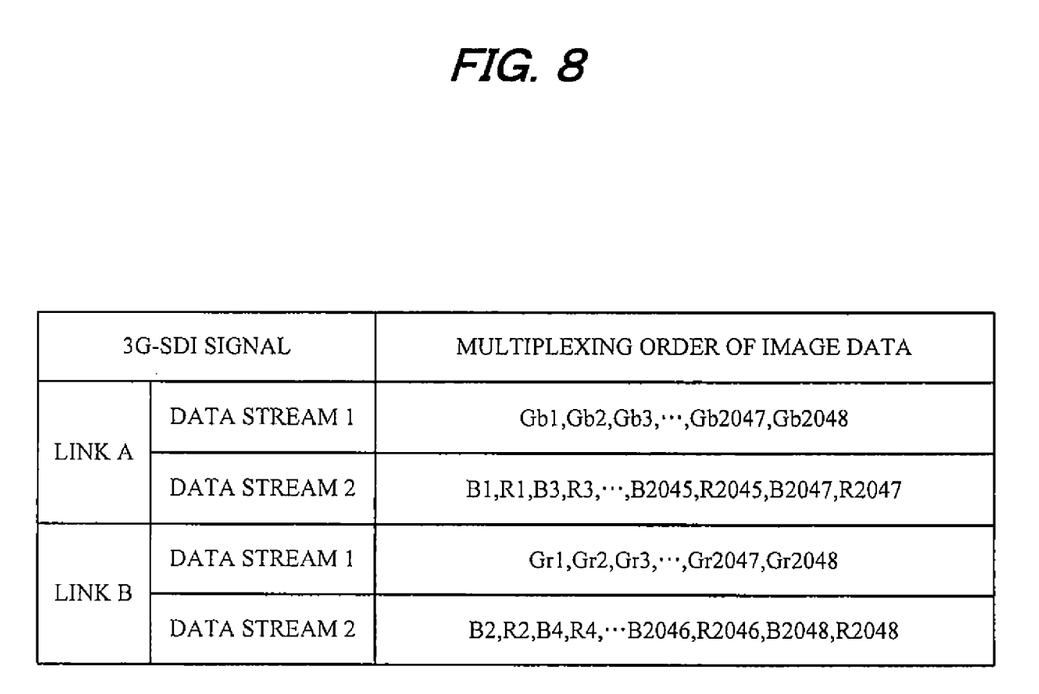
FIG. 8 is a diagram illustrating pixel data distributed to each data stream generated in the signal processing unit.

FIG. 8 illustrates a distribution configuration to respective channels of the pixel data multiplexed during an effective image period (digital active line) according to that standard. According to the distribution configuration, the control unit 112 sequentially supplies the pixel data to the respective multiplexing units that generate the data stream. For example, the multiplexing unit 305 receives the pixel data in the order of Gb(1), Gb(2), . . . Gb(2048) and generates a data stream 1 of Link A.

The control unit 112 supplies the peripheral pixel data of eight areas recorded in the memory 303 to the FIFO 701 in the same distribution method. A supply timing is calculated according to the multiplexing position (sample position) set in FIG. 6.

A line calculation unit 702 generates an identifier (SAV/EAV) for recognizing a pause position of the image signal with respect to a receiving apparatus that receives the moving image data output from the image pickup apparatus 100. Further, the line calculation unit 702 generates line number management data LN (line number) and transmission error check data CRCC (cyclic redundancy check code). A timing control unit 703 receives a read-out clock to control a timing of reading out the pixel data from the control unit 112 and timing information of the effective image period (digital active line) and the vertical/horizontal blanking area period. The timing information of the effective image period is a period in which the data of the effective pixel is multiplexed to the signal of the data stream. In addition, the timing information of the blanking area period is a period in which the peripheral pixel data is multiplexed. Timing information of multiplexing the peripheral pixel data of each area is calculated from the information of the data table of FIG. 6 by the control unit 112. Further, the timing control unit 703 generates a timing pulse for multiplexing the pixel data.

A switch-over control unit 704 controls a switch-over unit 706, and selects one side of the outputs from the FIFO 701 and the line calculation unit 702 and outputs the selected output to the RAM 705. The switch-over control unit 704 switches over a timing of reading out the pixel data from the FIFO 701 based on the supplied timing pulse. In addition, while switching over the read-out timing, the switch-over control unit 704 multiplexes the pixel data to the data stream which is being generated and multiplexes the SAV/EAV, the LN, and the CRCC thereto.

Figure 9:
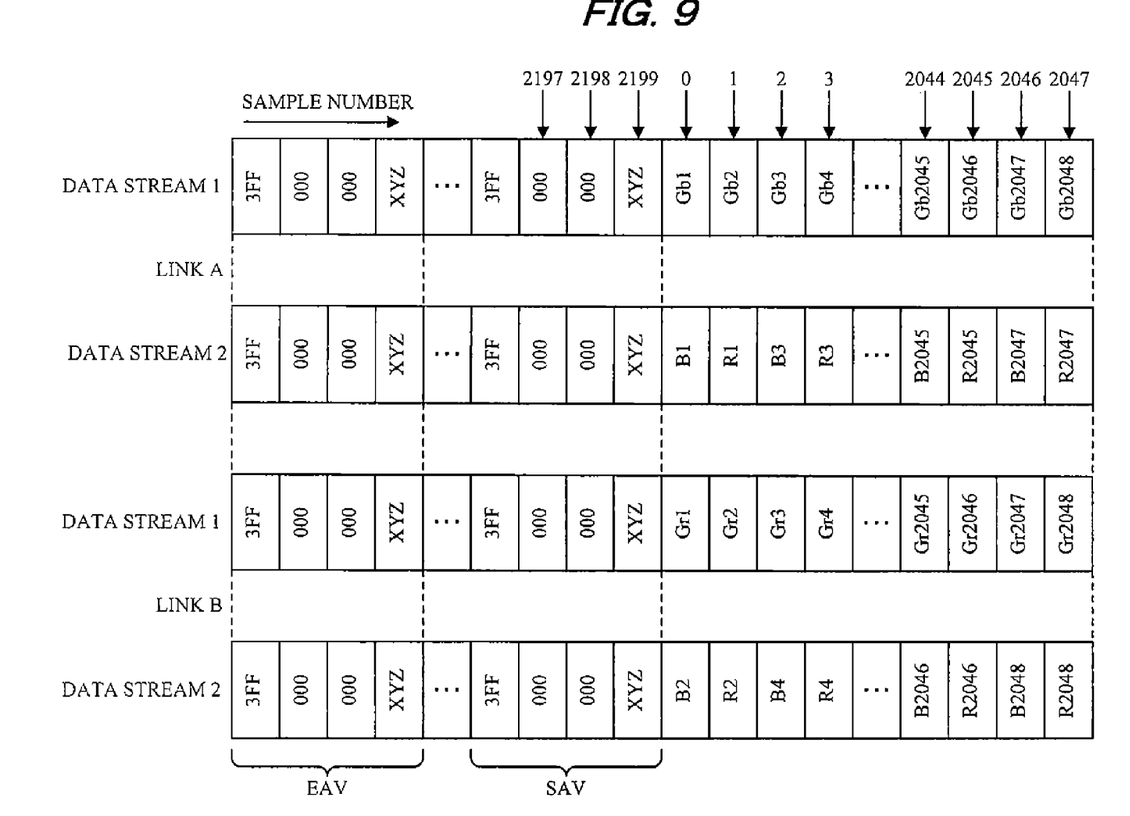
FIG. 9 is a diagram illustrating a data structure when one line of pixel data in storage data of FIG. 5 is multiplexed to four data streams corresponding to one line.

By the above-described operation, the multiplexing units 305 to 308 store the data stream in the respective RAMs 705. FIG. 9 illustrates a result of multiplexing one line of pixel data in each pixel plane illustrated in FIGS. 5A to 5D to four data streams corresponding to the one line (the multiplexed peripheral pixel data is omitted). For example, the numeral "3" of Gb3 indicates the pixel order starting from left pixel data of a pixel plane of Gb.

Herein, the pixel data of R, Gr, Gb, and B arranged in two lines, which constitute the RAW frame, are respectively multiplexed to the data stream of one line.

Figure 10:
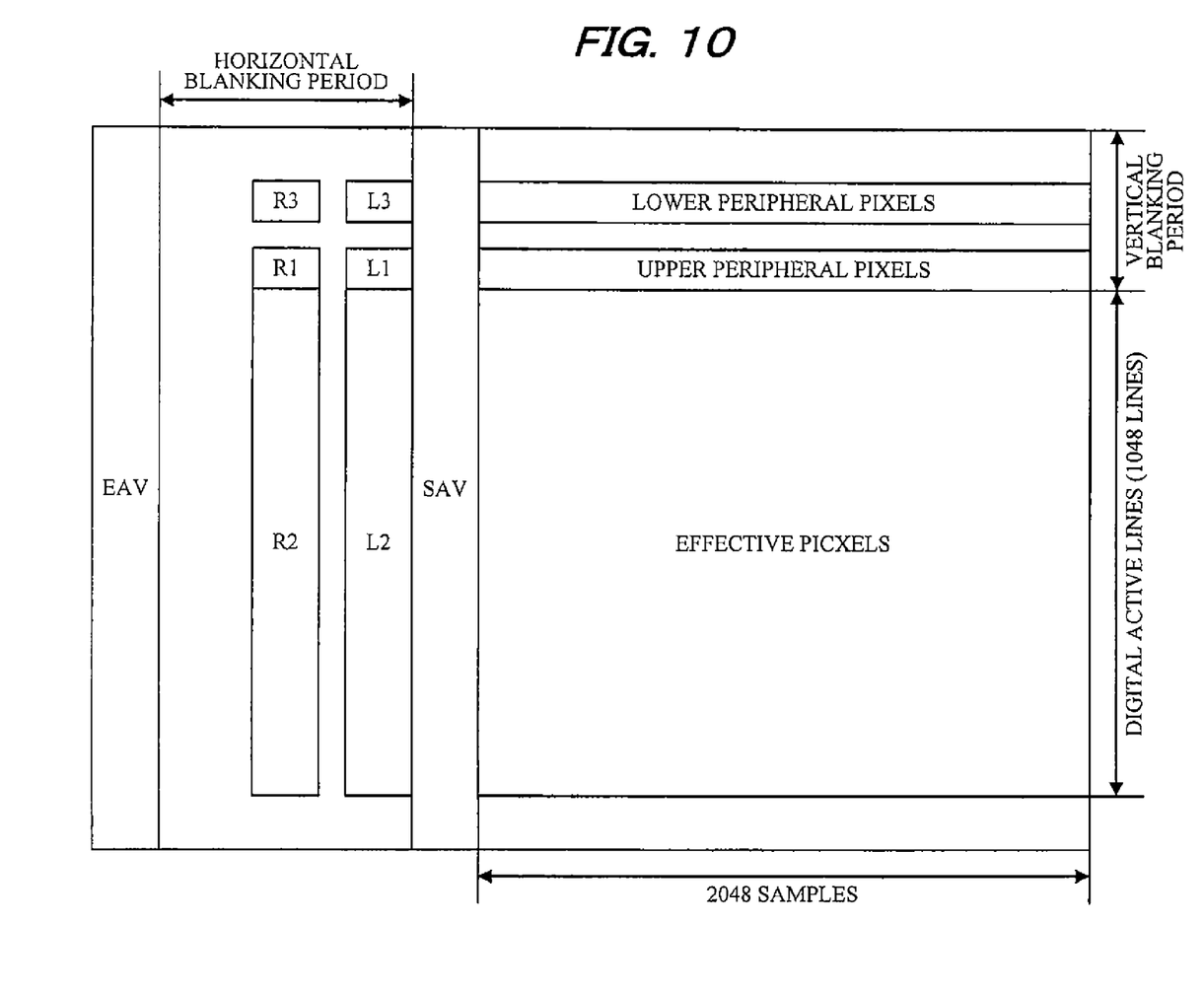
FIG. 10 is a diagram illustrating a data configuration of a data stream generated with respect to one RAW frame.

FIG. 10 illustrates a configuration of data of a data stream corresponding to one sheet of RAW frame generated by each multiplexing unit. In the peripheral pixel data, a sample position (sample number in the figure) is specified according to information of multiplexing position of the data table of FIG. 6 and the peripheral pixel data is multiplexed to the horizontal and vertical blanking areas.

In FIG. 3, an ancillary multiplexing unit 309 multiplexes a time code, a payload ID, and the information of the data table of FIG. 6 to the data stream supplied by the multiplexing units 305 to 308. A multiplexing method conforms with an SMPTE 291.

Figure 11:
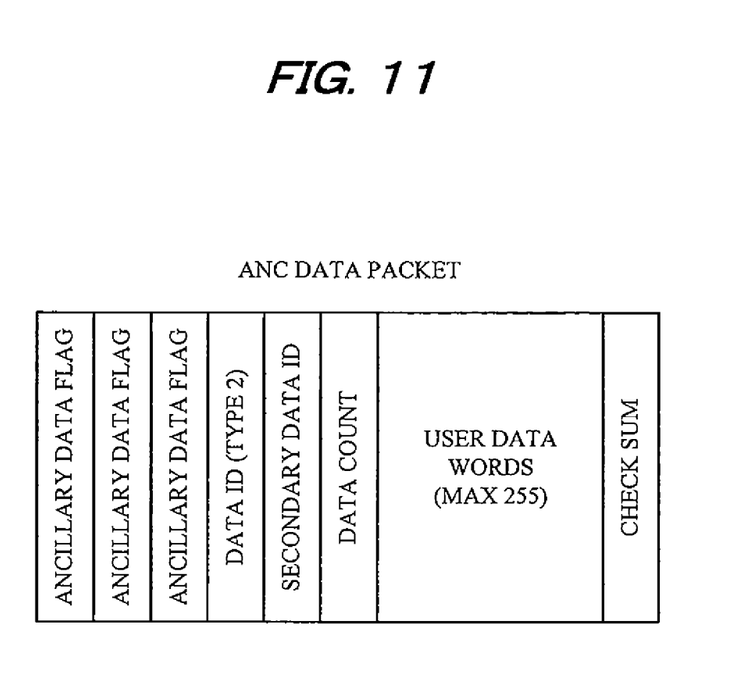
FIG. 11 is a diagram illustrating a configuration of an ANC packet storing information of a data table.

The ancillary multiplexing unit 309 stores the information of the data table, which is read out from the memory 114, in a user data word area configured in each 10 bit of an ancillary packet (ANC packet) of Type 2 illustrated in FIG. 11. As a format of the stored data, even any data format which can obtain the respective information as a value may be used. Further, a type of the ANC packet is identified with a data identifier (DID) and a secondary data identifier (SDID) which are header information. A predetermined value indicating information (meta information) on the data table defined in the present embodiment is set in those identifiers.

Figure 12:
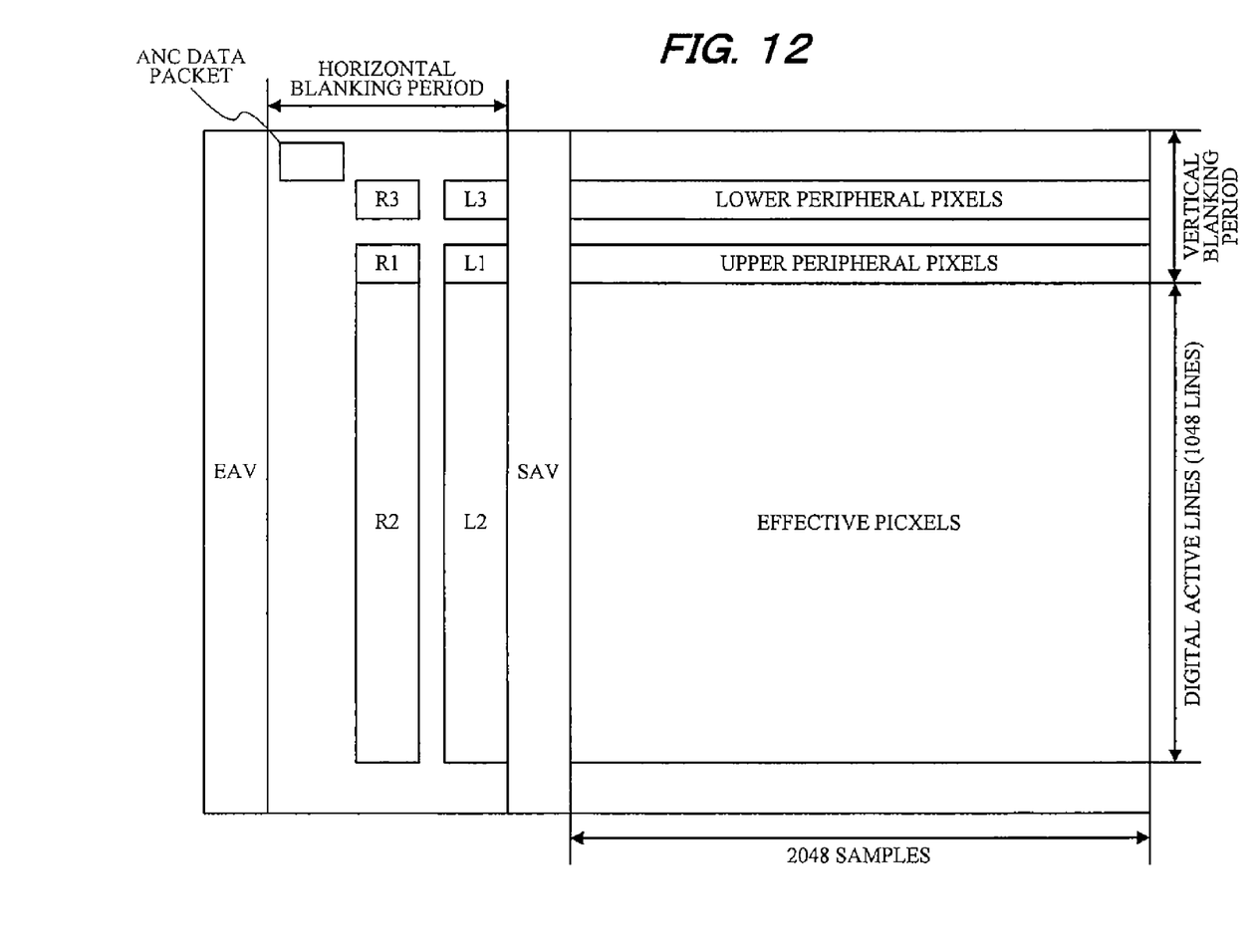
FIG. 12 is a diagram illustrating a data configuration of a data stream obtained by multiplexing the ANC packet storing the information of the data table.

For one example, the ancillary multiplexing unit 309 multiplexes the ANC data packet to the horizontal blanking area designated as a line number 6 of a data stream 1 of Link A. FIG. 12 illustrates a data configuration of a data stream obtaind by multiplexing the ANC packet.

The multiplexer 110 alternately multiplexes four data streams, in which various ANC packets are multiplexed by the ancillary multiplexing unit 309, by the unit of word in conformity with the SMPTE ST 425 into a single data stream and transmits the single data stream to the outside as a signal of 3G-SDI.

Further, in the present embodiment, as information which specifies a position of multiplexing the peripheral pixel data, information of a line number, a sample number, the number of lines, and the line of samples, which are multiplexed to the signal of the SDI, are set. However, as the information which specifies the multiplexing position, a method using information of an ID, which may uniformly specify the multiplexing position by, for example, a combination of a product number (a product type) and an operation mode of an image pickup apparatus, and the like, may be used.

In the signal of the SDI, in the case where information other than an effective pixel is multiplexed, the information is stored in the ANC packet to be superimposed on the blanking area. The data of the peripheral pixels positioned in the upper side portion and the lower side portion of the effective pixel as in the present embodiment, require multiplexing areas of several lines. In the case where the peripheral pixel data is stored in the user data word (255 words) of the ANC packet, the peripheral pixel data is divided into a plurality of packets to be stored. In this regard, in the present embodiment, the peripheral pixel data is not stored in the ANC packet but multiplexed to the blanking area. That is, when the data of the peripheral pixel is multiplexed to the blanking area of the data stream of the SDI, the same method as the multiplexing method of the pixel data in the digital active line is applied. This is a method of efficiently multiplexing the peripheral pixel data to an area on the signal of the SDI. As a result, as compared with the case in which the peripheral pixel data is stored in the ANC packet and multiplexed, the ANC packet header, which is redundant data, need not be multiplexed, and thus multiplexing areas need not be used needlessly.

Further, as described above, even for the multiplexed peripheral pixel data, information on multiplexing positions thereof and positional information of the peripheral pixel data thereof in the original RAW frame are stored in the ANC packet to be transmitted. As a result, a receiving side may accurately receive the packet according to a standard method which conforms with the SMPTE 291.

The receiving apparatus may specify and extract a position on the transmission signal where the peripheral pixel data of the effective pixel is multiplexed, by only analyzing the ANC packet.

In the present embodiment, data of an effective pixel of 4096×2048 configured in the Bayer structure and data of a peripheral pixel are transmitted. This pixel data may be converted into image data constituted by RGB signals by being reconfigured into an arrangement of the RAW frame of the Bayer structure in a workflow of a postprocess and thereafter, being subjected to deBayer processing.

Further, when the deBayer processing is performed, the peripheral pixel data transmitted in the present embodiment may be used in order to correctly develop peripheral areas which are located respectively in left, right, upper and lower side portions of the effective pixel of 4096×2048.

As such, according to the present invention, in the transmission process of the moving image frame data obtained from the pixel array of the Bayer structure, information of shortage of the pixel for interpolation processing of the area of the frame end is multiplexed to a predetermined position of the transmission signal. As a result, conversion processing of the received image data may be correctly performed in a transmitting destination.

Further, the image processing configuration of the present invention may be applied even to an apparatus, which has a data processing function and a transmission function, such as a PC, and the like as well as the aforementioned image pickup apparatus. In addition, only data processing of the present invention may be performed in other apparatuses and the image processing configuration may be applied even to other apparatuses in the case where the processed data is supplied and transmitted to the apparatus having a communication function, such as the PC, and the like.

Further, in the aforementioned embodiment, the generation configuration of the transmission data of the image data illustrated in FIGS. 3, 6 to 9, and 11 may also be implemented by reading out a program for implementing each function included in the corresponding configuration from the memory 113 and by executing the read-out program by a CPU of the control unit 112.

In this case, functions of all or some of respective processing according to the configurations illustrated in FIGS. 3, 6 to 9, and 11 may be implemented by exclusive hardware. Further, the memory is not limited to a nonvolatile memory such as the flash memory, and the like and may adopt a magneto-optical disk device, a recording medium, which is capable of only reading out data, such as a CD-ROM, and the like, and a volatile memory other than the RAM. In addition, the memory may be configured by a recording medium which is readable and writable by a computer by combinations thereof.

Further, the program for implementing the function of the generation processing of the transmission data of the present invention is recorded in a computer-readable recording medium and the program recorded in the recording medium is read and executed by a system to implement each processing. In addition, a "computer system" described herein includes hardware such as an OS or a peripheral device. Specifically, a program which is read out from a storage medium is written in a memory provided in a function extension board inserted in the computer or a function extension unit connected to the computer. Thereafter, a CPU, and the like provided in the function extension board or the function extension unit perform some or all of actual processing, based on an instruction of the program and the functions of the embodiment may also be implemented by the processing.

Further, the "computer-readable recording medium" represents storage devices such as a flexible disk, a magneto-optical disk, a ROM, a portable medium such as a CD-ROM, and the like, a hard disk embedded in the computer system, and the like. In addition, the "computer-readable recording medium" includes even a medium that holds a program for a predetermined time. For example, the computer-readable recording medium includes a volatile memory (RAM) in the computer system which becomes a server or a client when the program is transmitted via a network such as the Internet, and the like or a communication line such as a telephone line, and the like.

Further, the program the program may be transmitted to other computer systems from the computer storing the program in the storage device via a transmission medium or by a transmission wave in the transmission medium. Herein, the "transmission medium" that transmits the program represents a medium that serves to transmit information such as the network (communication network) such as the Internet, and the like or the communication line such as the telephone line.

Further, the program may be used to implement some of the functions. In addition, the program may implement the functions by a combination of the function with a program which is already recorded, that is, may be a so called differential file (differential program).

Further, a program product such as a computer-readable recording medium having the program recorded therein may also be applied as the embodiment of the present invention. The program, the recording medium, the transmission medium, and the program product are included in a scope of the present invention.

As described above, although the embodiments of the present invention have been described in detail with reference to the accompanying drawings, a detailed configuration is not limited to the embodiments and a design of a scope which does not depart from the spirit of the present invention, and the like are also included.

This application claims the benefit of Japanese Patent Application No. 2012-079529, filed on Mar. 30, 2012, which is hereby incorporated by reference herein in its entirety.

What is claimed is:

1. An image processing apparatus comprising:
   an obtaining unit configured to obtain moving image data output from an image pickup element having a predetermined pixel array;
   a generation unit configured to generate a data stream including image data of an effective area, in accordance with a transmission method of transmitting the image data of the effective area of the moving image data, the generation unit generating the data stream by multiplexing image data of an area on the periphery of the effective area and positional information on a position where the image data of the peripheral area is multiplexed, onto the image data of the effective area; and
   a transmission unit configured to transmit the data stream generated by the generation unit.

2. An apparatus according to claim 1, wherein the generation unit determines the peripheral area in the moving image data on the basis of information on the pixel array.

3. An apparatus according to claim 1, wherein the generation unit determines a position for multiplexing the image data of the peripheral area on the basis of the information on the pixel array and the transmission method.

4. An apparatus according to claim 1, wherein the generation unit multiplexes the image data of the peripheral area and the positional information during a blanking period in the data stream.

5. An apparatus according to claim 1, wherein the positional information indicates a line number and a sample number of line and sample where the image data of the peripheral area is multiplexed.

6. An apparatus according to claim 1, wherein the generation unit multiplexes the image data of the effective area and the image data of the peripheral area in accordance with the same multiplexing method, thereby generating the data stream.

7. An apparatus according to claim 1, wherein
   the generation unit stores the positional information in a packet and multiplexes the packet storing the positional information during the blanking period in the data stream, and
   the generation unit multiplexes the image data of the peripheral area during the blanking period without storing the image data of the peripheral area in the packet.

8. An apparatus according to claim 7, wherein the packet includes identification information for identifying a type of the packet.

9. An apparatus according to claim 1, wherein the image data of the peripheral area is used for interpolation processing of the image data of the effective area.

10. An image processing apparatus comprising:
    an obtaining unit configured to obtain RAW moving image data having a pixel array of a Bayer structure;
    a generation unit configured to generate a data stream including image data of an effective area in the RAW moving image data in accordance with a serial digital interface method, the generation unit generating the data stream by multiplexing image data of an area on the periphery of the effective area and positional information on a position where the image data of the peripheral area is multiplexed, onto the image data of the effective area; and
    a transmission unit configured to transmit the data stream generated by the generation unit in accordance with an SDI method.

11. An image processing method comprising the steps of:
    obtaining moving image data output from an image pickup element having a predetermined pixel array;
    generating a data stream including image data of an effective area, in accordance with a transmission method of transmitting the image data of the effective area of the moving image data, the generating step generating the data stream by multiplexing image data of an area on the periphery of the effective area and positional information on a position where the image data of the peripheral area is multiplexed, onto the image data of the effective area; and
    transmitting the data stream generated in the generating step.

12. An image processing method comprising the steps of:
    obtaining RAW moving image data having a pixel array of a Bayer structure;
    generating a data stream including image data of an effective area in the RAW moving image data in accordance with a serial digital interface method, the generating step generating the data stream by multiplexing image data of an area on the periphery of the effective area and positional information on a position where the image data of the peripheral area is multiplexed, onto the image data of the effective area; and
    transmitting the data stream generated in the generating step in accordance with the SDI method.

13. A non-transitory computer-readable storage medium storing a computer program for causing a computer to control an image processing apparatus for processing moving image data output from an image pickup element having a predetermined pixel array, comprising:
    first program code means for obtaining the moving image data;
    second program code means for generating a data stream including image data of an effective area, in accordance with a transmission method of transmitting the image data of the effective area of the moving image data, the second program code means generating the data stream by multiplexing image data of an area on the periphery of the effective area and positional information on a position where the image data of the peripheral area is multiplexed, onto the image data of the effective area; and
    third program code means for transmitting the data stream generated in the second program code means.

14. A non-transitory computer-readable storage medium storing a computer program for causing a computer to control an image processing apparatus for processing RAW moving image data having a pixel array of a Bayer structure, comprising:
    first program code means for obtaining the RAW moving image data having the pixel array of the Bayer structure;
    second program code means for generating a data stream including image data of an effective area in the RAW moving image data in accordance with a serial digital interface method, the second program code means generating the data stream by multiplexing image data of an area on the periphery of the effective area and positional information on a position where the image data of the peripheral area is multiplexed, onto the image data of the effective area; and third program code means for transmitting the data stream generated by the second program code means in accordance with the SDI method.

\* \* \* \* \*